(12) United States Patent
Oldham et al.

(10) Patent No.: US 11,736,581 B2
(45) Date of Patent: Aug. 22, 2023

(54) SYSTEMS AND METHODS FOR VISUALIZATION OF ELECTRONIC SOCIAL NETWORK CONTENT

(71) Applicant: REPUTATION.COM, INC., San Ramon, CA (US)

(72) Inventors: David A. Oldham, Draper, UT (US); Thomas A. Holloway, Murray, UT (US); Gavin Aiken, Stansted (GB); Timothy J. Benzinger, New Milford, CT (US); Matthew J. Kruskamp, Murray, UT (US); Dustin R. Dahl, Portland, OR (US)

(73) Assignee: Reputation.com, Inc., San Ramon, CA (US)

( * ) Notice: Subject to any disclaimer, the term of this patent is extended or adjusted under 35 U.S.C. 154(b) by 0 days.

(21) Appl. No.: 17/461,728

(22) Filed: Aug. 30, 2021

(65) Prior Publication Data

US 2022/0166841 A1    May 26, 2022

Related U.S. Application Data

(63) Continuation of application No. 16/192,489, filed on Nov. 15, 2018, now Pat. No. 11,108,876, which is a continuation of application No. 13/933,022, filed on Jul. 1, 2013, now Pat. No. 10,165,067.

(60) Provisional application No. 61/666,179, filed on Jun. 29, 2012.

(51) Int. Cl.
*G06Q 50/00* (2012.01)
*H04L 67/50* (2022.01)
*G06Q 10/00* (2023.01)

(52) U.S. Cl.
CPC .......... *H04L 67/535* (2022.05); *G06Q 10/00* (2013.01); *G06Q 50/01* (2013.01)

(58) Field of Classification Search
CPC ......... H04L 67/22; G06Q 10/00; G06Q 50/01
See application file for complete search history.

(56) References Cited

U.S. PATENT DOCUMENTS

| | | |
|---|---|---|
| 9,262,517 B2 * | 2/2016 | Feng ..................... G06Q 50/01 |
| 2006/0156246 A1 | 7/2006 | Williams et al. |
| 2006/0173824 A1 | 8/2006 | Bensky et al. |

(Continued)

*Primary Examiner* — Beau D Spratt
(74) *Attorney, Agent, or Firm* — Foley & Lardner, LLP

(57) ABSTRACT

Systems and methods of visualization of electronic social network content are disclosed. A monitor may be designated. The monitor may include criteria specifying desired characteristics of mentions of electronic social network content. Electronic social network content, including mentions, is received from one or more electronic social network platforms. A timeline is presented. The timeline can be representative of a period of time corresponding to when at least a portion of the electronic social network content was provided to electronic social network platforms. A plurality of graphical depictions is presented that match the one or more search criteria of the monitor. Each graphical depiction is presented on the timeline at a position corresponding to a time at which the corresponding mention was provided to a corresponding electronic social network platform. An individual graphical depiction may be sized, colored, and/or shaped to convey additional information about the corresponding mention.

21 Claims, 9 Drawing Sheets

(56) References Cited

U.S. PATENT DOCUMENTS

| | | | |
|---|---|---|---|
| 2007/0294281 A1* | 12/2007 | Ward | G06Q 50/01 707/999.102 |
| 2008/0294663 A1* | 11/2008 | Heinley | G11B 27/34 715/764 |
| 2010/0088322 A1 | 4/2010 | Chowdhury et al. | |
| 2010/0121707 A1 | 5/2010 | Goeldi | |
| 2010/0275128 A1* | 10/2010 | Ward | G06Q 10/10 715/744 |
| 2011/0113348 A1* | 5/2011 | Twiss | G06Q 10/10 715/753 |
| 2011/0202866 A1* | 8/2011 | Huang | G06F 3/0482 715/779 |
| 2011/0246463 A1 | 10/2011 | Carson et al. | |
| 2012/0011103 A1 | 1/2012 | Joo et al. | |
| 2012/0047219 A1 | 2/2012 | Feng et al. | |
| 2012/0246054 A1* | 9/2012 | Sastri | G06Q 50/01 705/37 |
| 2013/0046826 A1 | 2/2013 | Stanton | |
| 2013/0073984 A1 | 3/2013 | Lessin et al. | |
| 2013/0073995 A1 | 3/2013 | Piantino et al. | |
| 2013/0086501 A1* | 4/2013 | Chow | G06F 16/2477 715/772 |
| 2013/0191388 A1 | 7/2013 | Bernhardt et al. | |
| 2013/0212479 A1 | 8/2013 | Willis et al. | |
| 2014/0006975 A1 | 1/2014 | Oldham et al. | |
| 2016/0171764 A1* | 6/2016 | Chew | G06T 17/20 345/423 |

\* cited by examiner

SYSTEMS AND METHODS FOR VISUALIZATION OF ELECTRONIC SOCIAL NETWORK CONTENT

RELATED APPLICATIONS

This application is a continuation of U.S. patent application Ser. No. 16/192,489, titled "SYSTEMS AND METHODS FOR VISUALIZATION OF ELECTRONIC SOCIAL NETWORK CONTENT," filed Nov. 15, 2018, which is a continuation of U.S. patent application Ser. No. 13/933,022 titled SYSTEMS AND METHODS FOR VISUALIZATION OF ELECTRONIC SOCIAL NETWORK CONTENT," filed Jul. 1, 2013, which claims the benefit under 35 U.S.C. § 119(e) of U.S. Provisional Patent Application No. 61/666,179, titled "A REAL-TIME, INTERACTIVE VISUALIZATION OF SOCIAL CONVERSATIONS REPRESENTED BY FLOATING SHAPES ON A TIMELINE," filed Jun. 29, 2012, each of which is hereby incorporated by reference herein in its entirety.

COPYRIGHT NOTICE

© 2021 NUVI, LLC. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

The present disclosure relates to electronic social networking. More specifically, the present disclosure relates to systems and methods of visualization of social media and other electronic social network content.

BRIEF DESCRIPTION OF THE DRAWINGS

Non-limiting and non-exhaustive embodiments of the disclosure are described herein, including various embodiments of the disclosure illustrated in the accompanying drawings.

DETAILED DESCRIPTION OF PREFERRED EMBODIMENTS

Figure 1:
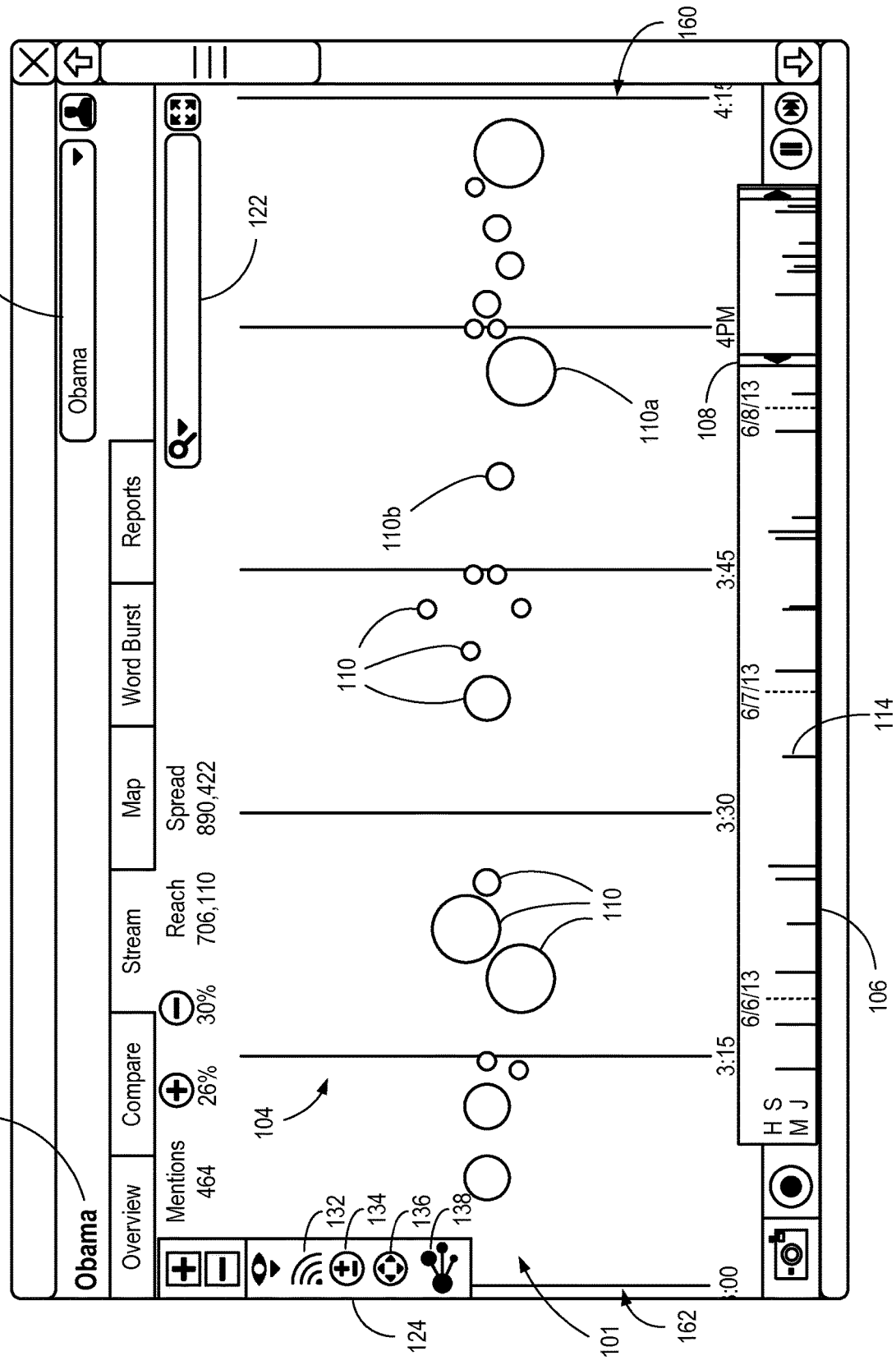
FIG. 1 is a user interface of a system for visualization of electronic social network content, according to one embodiment.

The volume of conversation and other communication taking place on forums, blogs, message boards, websites, and other electronic social network platforms is rapidly expanding. Such conversation and communication, and other social media, is proliferating rapidly as more and more social networks and other platforms for virtual communication appear.

As used herein, electronic social network content (sometimes referred to as social media), may include any interaction among people in which they create, exchange, or otherwise share information or ideas through a virtual community or other electronic platform. An instance of electronic social network content may be referred to as a "mention." For example, a mention may include but is not limited to a post, a blog entry, a news item (e.g., a headline, an alert), a tweet, an image, audio content, video content, an electronic discussion message, etc., or any other unit of electronic social network content.

Examples of virtual communities and other electronic social network platforms in which electronic social network content is generated include, but are not limited to, Facebook®, Twitter®, Linkedin®, Instagram®, Mashable®, Google®, YouTube®, Digg®, Vimeo®, Flickr®, Pinterest®, MySpace®, Reddit®, Delicious®, and others as they become available. More and more social media platforms are being launched as social networking proliferates.

Because the volume of electronic social network content is great and rapidly expanding, it can be difficult to monitor, analyze, interact with, or otherwise interface with such large volumes of electronic social network content. Existing tools have been developed to process and even visualize electronic social network content. However, these tools are very textual (e.g., limited to presenting streams of text) or merely use graphs and are difficult to decipher. These existing tools do not enable a user to quickly or easily identify which mentions or conversations (e.g., a string of interrelated mentions) may be significant or important. Identifying trends, patterns, and other insights from electronic social network content is challenging and cumbersome. Existing tools for visualizing electronic social network content do not address the challenges of interfacing with large amounts of electronic social network content, particularly in a real-time manner.

The embodiments of the present disclosure present or otherwise provide a visualization of electronic social network content that allows a user to monitor, interact with, and discover insights from social conversations in real-time. The embodiments of the present disclosure visualize large amounts of electronic social network content mentions and/or conversations in such a way that a user can, in a single glance, identify which mentions or conversations are of interest and/or of importance and why. Individual social mentions (e.g., a tweet, a post, a blog entry, a comment on a website, a video, a photo caption, etc.) may be visualized in a stream of "floating" graphical depictions (e.g., shapes) on a display of a computing system, such as within a web browser, to enable a user to easily monitor and interact with large volumes of electronic social network content mentions and conversations.

The embodiments of the disclosure will be best understood by reference to the drawings, wherein like elements are designated by like numerals throughout. In the following description, numerous specific details are provided for a thorough understanding of the embodiments described herein. However, those of skill in the art will recognize that one or more of the specific details may be omitted, or other methods, components, or materials may be used. In some cases, operations are not shown or described in detail.

FIG. 1 illustrates a user interface 100 of a system for visualization of electronic social network content presenting a visualization 101 of mentions of electronic social network content, according to one embodiment. The mentions of electronic social network content may be provided to one or more electronic social network platforms by a plurality of different mention authors. The user interface 100 may be presented, and thereby provide the visualization 101, on a display of a computing device (e.g., a client computing device) within a browser window.

The user interface 100 of FIG. 1 includes the visualization 101, a monitor input field 120, a search input field 122, and a tool bar 124. The visualization 101 provides a visual representation of a plurality of mentions of electronic social network content that enables easy and efficient monitoring of and interaction with the mentions. The plurality of mentions of electronic social network content may be retrieved, obtained, or otherwise received from one or more electronic social network platforms. The monitor input field 120, the search input field 122, and/or the tool bar 124 may facilitate manipulation of and interaction with the received electronic social network content, including designation and/or selection of a desired portion of the mentions of the received electronic social network content for visualization. Each of these elements is discussed in greater detail below.

The visualization 101 that is presented by the user interface 100 may include a timeline 104 that represents a period of time corresponding to when at least a portion (e.g., a monitored portion) of the electronic social network content was provided or contributed to the one or more electronic social network platforms. For example, in FIG. 1, the timeline 104 that is displayed represents a period of time between 3:00 PM and 4:15 PM on a given day (e.g., Jun. 8, 2013). In FIG. 1, the timeline 104 is a horizontal timeline extending from left to right across the user interface 100. A right side 160 of the timeline 104 is representative of more current time and a left side 162 of the timeline 104 is representative of past (or historical time). In a real-time operation mode, a current time may appear at or near the right side 160 of the timeline 104 and, as time elapses, the timeline 104 may automatically shift toward the left and an oldest displayed portion of the timeline (at the left side 162 of the timeline 104) may automatically disappear (or shift off the visualization 101) to provide space for representation of a new current time.

A timeline manipulation bar 106 provides context for the period of time presently visualized or presented in the visualization 101 and may enable a user to designate a desired period of time to be presented on the timeline 104 using a period selector 108. The timeline manipulation bar 106 may also facilitate input specifying a scale of the timeline 104, such as seconds, minutes, hours, days, or the like. The timeline manipulation bar 106 may provide a visualization of a volume of mentions at any given point of time. For example, in the embodiment of FIG. 1, the timeline manipulation bar 106 provides volume bars 114 that visualize a number of mentions at a given point in time. A user is able to quickly identify point in time of high activity (e.g., a high number of mentions) related to the present monitor, keyword search, and/or filter.

Figure 8:
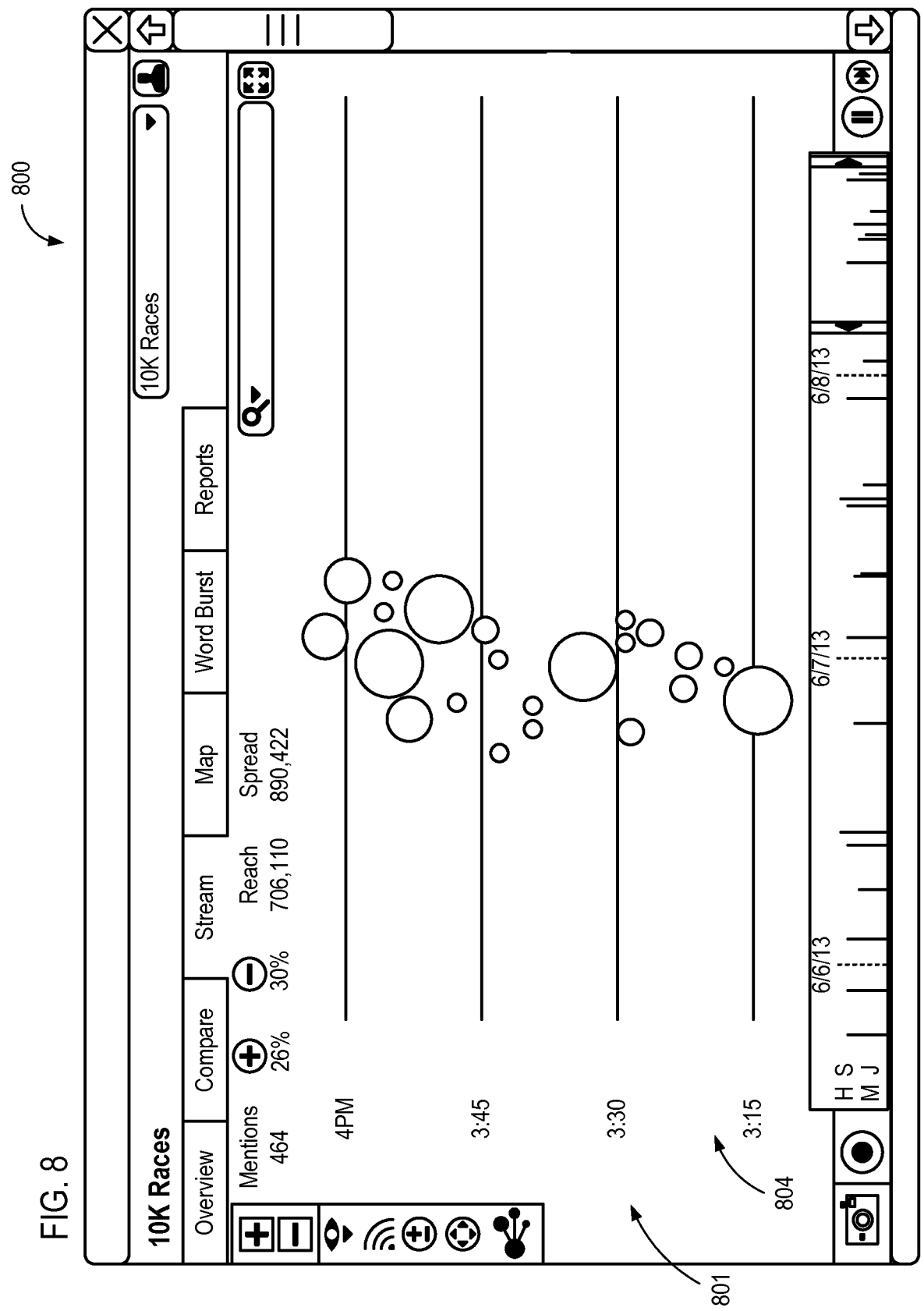
FIG. 8 is a user interface of a system for visualization of electronic social network content, according to another embodiment.

In other embodiments, a timeline 104 having a format other than a horizontal format may be presented. For example, a timeline having a vertical format may be presented, such as is shown in FIG. 8 and described below with reference to the same.

The visualization 101 presented by the user interface 100 of FIG. 1 includes a plurality of 'bubbles' or graphical depictions 110 that each represent a mention of electronic social network content. The plurality of graphical depictions 110 are representative of at least a portion (e.g., a monitored portion) of the received electronic social network content that matches one or more search criteria of a designated monitor, such as the "Obama" monitor 130 designated via the monitor input field 120, as shown in FIG. 1. Each graphical depiction 110 of the plurality of graphical depictions 110 may represent one corresponding mention of the plurality of mentions of the visualized portion of the received electronic social network content.

Each graphical depiction 110 of FIG. 1 is presented on the timeline at a position corresponding to a time at which the corresponding mention was provided to a corresponding electronic social network platform. For example, a mention corresponding to graphical depiction 110a was provided at least a couple of minutes before 4:00 PM and therefore the graphical depiction 110a is presented on the timeline 104 slightly to the left of a representation of 4:00 PM (e.g., a hash line of the timeline 104 that is labeled 4:00 PM).

The plurality of graphical depictions 110 may have different sizes, colors, and/or shapes to convey information and/or characteristics of the corresponding mention. In the visualization 101 of FIG. 1, each graphical depiction 110 is sized according to a level of influence (or authority) of an author of the corresponding mention. For example, graphical depiction 110a is larger than graphical depiction 110b, which indicates that the author of the mention corresponding to graphical depiction 110a is someone of greater influence or authority than the author of the mention corresponding to graphical depiction 110b. As can be appreciated, in other embodiments, size of the graphical depictions 110 may convey other information about the corresponding mentions. For example, a size of the graphical depictions 110 may convey a number of followers or fans of the author of the mention, a number of people that have clicked on (or otherwise accessed) the mention in the respective electronic social network platform, a number of times a mention has been "favorited," liked, or commented on, a number of times a mention has been shared, or a type of the mention (e.g., tweet on Twitter, Facebook post, photo on Instagram, video on YouTube, etc.).

In the visualization of FIG. 1, each graphical depiction 110 is colored to convey a sentiment (or tone) of the corresponding mention. For example, a graphical depiction 110 may be colored red to convey that the corresponding mention has a negative sentiment, blue to convey that the corresponding mention has a neutral sentiment, and green to convey that the corresponding mention has a positive sentiment. Other colors may convey other sentiments (or tones), including but not limited to a humorous sentiment, a political sentiment, an opinionated (or subjective) sentiment, a factual (or objective) sentiment, a sarcastic sentiment, purchase intent, inquiry or question, terrorist threat or safety concern (i.e., digital bullying among teenagers), mention from a customer vs a non-customer, demographic info (e.g., male vs female or various age groups), mentions from different geographic areas, or any of a variety of sentiments that may be ascertainable from a mention. Colors may be used in other ways to convey information. For example a color of a border of the shape may convey a status (e.g., read/unread, responded to, forwarded) or a level of importance, or otherwise mark the graphical depiction 110.

Figure 7:
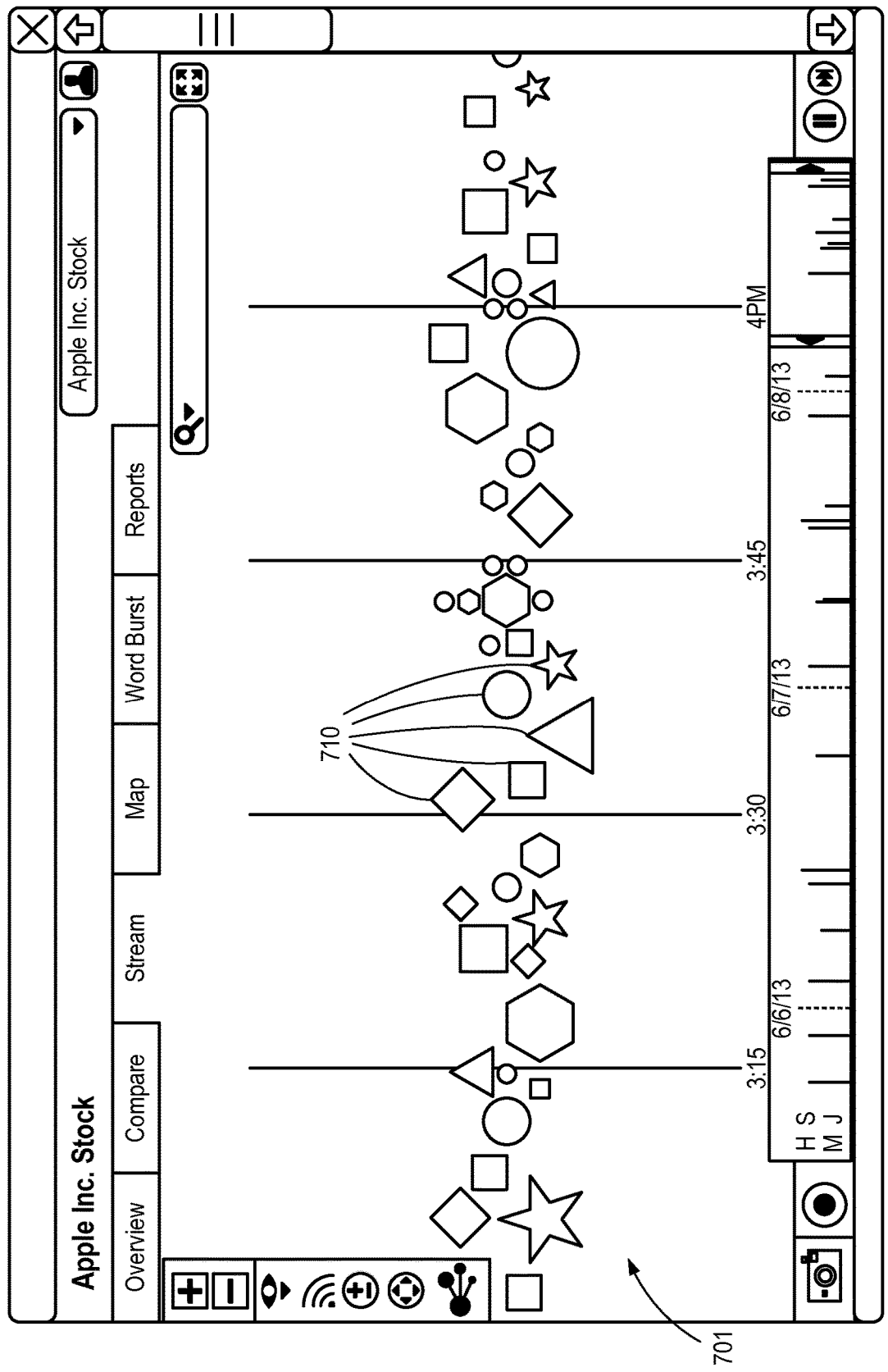
FIG. 7 is a user interface of a system for visualization of electronic social network content, according to another embodiment.

A graphical depiction 110 may also be shaped to convey additional information and/or a characteristic of the corresponding mention. In FIG. 1, the plurality of graphical depictions 110 may all be the same shape, e.g., circular, and thus may not convey helpful additional information about corresponding mentions. An embodiment in which the plurality of graphical depictions 110 includes a variety of shapes is shown in FIG. 7, and discussed below with reference to the same.

A graphical depiction 110 may include other graphical and/or visual features to convey information. For example, an icon (e.g., star, flag, etc.) adjacent to, on, or overlaying a shape of the graphical depiction may convey additional information, such as information about the author (e.g., age, gender, nationality, affiliation(s)), a native electronic social network platform of the corresponding mention of the graphical depiction, type of content (e.g., text, image, audio, video, etc., and/or combination thereof) and the like.

A graphical depiction 110 may include any of a combination of visual features, any of which may be non-textual and/or purely graphical in nature. In other words, the mentions of received electronic social network content that match the search criteria of the monitor may be visualized by graphical depictions 110 that do not include any of the actual content (e.g., text, image, audio, and video) of the mention.

The monitor input field 120 may receive input from a user designating and/or defining a monitor 130. In FIG. 1, the monitor 130 is "Obama," a topic monitor configured to select or identify electronic social network content relating to Barack Obama, the President of the United States of America. As used herein, a monitor may include one or more criteria for identifying or selecting a desired portion, or monitored portion, of the received electronic social network content for visualization. The monitor input field 120 may receive input designating a pre-configured (e.g., previously defined) monitor 130. In another embodiment, the monitor input field 120 may receive criteria for defining a monitor.

The "Obama" monitor 130, as mentioned above, is a topic monitor, which is configured to specify a monitored portion of the electronic social network content related to a desired topic (e.g., President Barack Obama). Another example of a topic monitor might be "Apple stock" to designate as a monitored portion of the mentions of the electronic social network content that are related to the stock of Apple Inc. Other types of monitors may be possible. For example, a monitor may be a group monitor configured to designate as a monitored portion of content a portion of electronic social network content contributed by a desired group of mention authors (e.g., a user may desire to monitor mentions of electronic social network content contributed by, for example, current or former NFL® football players). As another example, a monitor may be a geographic monitor configured to designate a monitored portion of content that is a portion of electronic social network content relating to, contributed from, or contributed by an author from a desired geographic location or geographic region (e.g., Seattle, Seattle metro region, the Pacific Northwest). The monitor input field 120 may receive input designating a pre-configured (e.g., a previously defined) monitor 130 and/or may receive input specifying criteria to define a new monitor or to edit an existing monitor. For example, in FIG. 1, the monitor input field 120 may include a drop-down list providing an alphabetical listing of pre-configured monitors.

The search input field 122 may receive input providing a search query. The search query may be used to search the monitored portion of electronic social network content and further select (or filter) the monitored portion based on the search query. For example, the monitored portion resulting from the "Obama" monitor 130 may be searched for "NSA or National Security Agency" to identify mentions relating to Obama and to the NSA or National Security Agency. The search input field 122 may enable, for example, a keyword search within the mentions of the monitored portion of electronic social network content. Described another way, the search input field 122 may enable, for example, a temporarily relevant, more specific search within a monitored portion of electronic social network content that was selected by a more generally defined (and possibly more long-term) monitor.

The tool bar 124 may provide one or more temporary filters that a user can apply to further filter a monitored portion of electronic social network content. For example, the tool bar 124 may provide source filters 132 that, when applied, filter the monitored portion of social electronic network content according to designated electronic social network platforms. A facebook platform filter, when applied, may filter the mentions to include those contributed to the facebook platform, a Linkedin platform filter may filter the mentions to include those contributed to the Linkedin platform, a twitter platform filter may filter the mentions to include those contributed to the twitter platform, and so on. The toolbar 124 may provide sentiment filters 134 that, when applied, may filter the mentions based on a sentiment or tone of the mentions. The tool bar may provide a geographic filter 136 that shows mentions from authors located in a specific geographic area. The tool bar 124 may provide a connections filter 138 that may display or hide visualization of related mentions, such as are shown in FIG. 8. The tool bar 124 may provide other filters, including but not limited to filters to hide or show mentions related to other criteria (influence, followers, geography, demographics, customer vs non-customer, voter vs non-voter, and other custom criteria that may be configured, such as in an admin page).

As illustrated in FIG. 1, the graphical depictions 110 may omit text. In other embodiments, text, such as text identifying a user, or a limited portion of the text of the mention, may be included in some or all of the graphical depictions 110. For the embodiment of FIG. 1, textual information of the mentions may be displayed upon manipulation of (e.g., clicking on) the graphical depictions 110. Each graphical depiction 110 may be actuatable (e.g., clickable, hoverable) to enable or otherwise facilitate interaction with the received electronic social network content.

Figure 2:
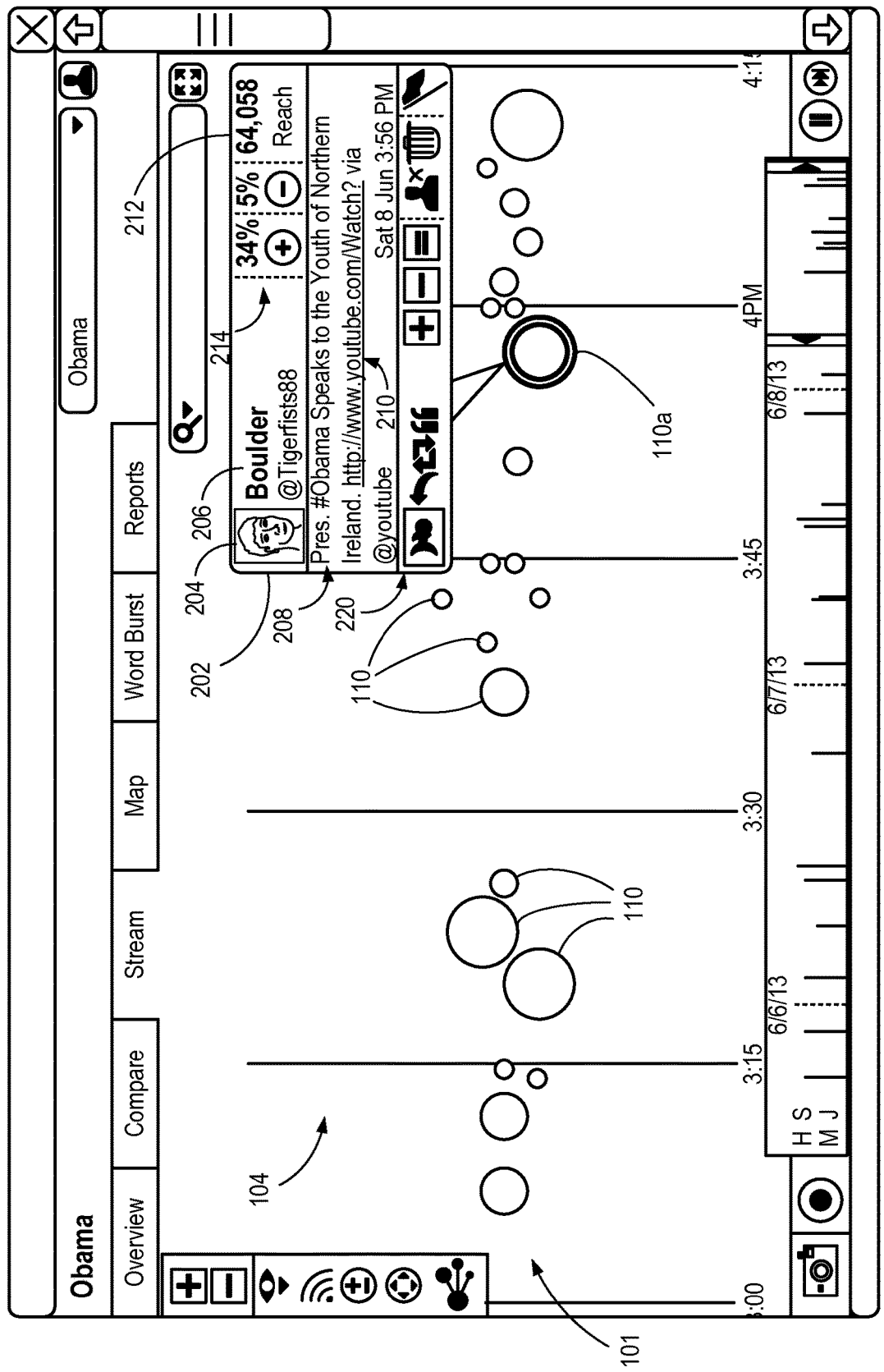
FIG. 2 is the user interface of FIG. 1 presenting additional information regarding a selected mention.

FIG. 2 is the user interface of FIG. 1 presenting additional information regarding a mention of a selected graphical depiction 110a. A plurality of mentions are represented as graphical depictions 110 on the timeline 104. In the embodiment of FIGS. 1 and 2, text may be displayed or otherwise presented (e.g., an audible presentation), upon manipulation and/or selection of a graphical depiction 110. The text may convey information pertaining to a corresponding mention. In FIG. 2, a textual depiction 202, such as a pop-up window (or floating card) may appear in association with given graphical depiction 110, such as graphical depiction 110a, upon user manipulation or selection of the given graphical depiction 110a. For example, a mouse click on the graphical depiction 110a may launch a presentation or visualization of the textual depiction 202. In another example, a mere mouse hover over the graphical depiction 110a may be a manipulation to display the textual depiction 202. A border of the selected graphical depiction 110a may be changed to indicate selection or to otherwise convey which of the graphical depictions 110 is currently being supplemented with a corresponding textual depiction 202. The textual depiction 202 may provide information about the author of the mention, the content of the mention, a date and/or time stamp of the mention, and tools for processing or otherwise taking an action on the mention.

The textual depiction 202 of FIG. 2 may include information about the author of the mention, such as a photo 204 or icon or other image, a name, a user name 206, an influence indicator 212 to provide a level of influence of the author, an age of the author, a location of the author, gender of the author, a biography or other description of the author, and/or any information available or otherwise obtainable about the author. The information about the author, such as the photo 204 and user name 206, may be derived, for example, from a user profile of the author on the electronic social network platform to which the mention was provided, or on another so electronic social network platform of which the author is a part. The information about the author may also include one or more indicators 214 conveying information regarding a sentiment of other mentions provided by the author that match the one or more search criteria of the monitor.

The textual depiction 202 may also include textual information about the mention, such as a caption 208 providing a brief summary or preview of the mention and/or an electronic link 210 to a native presentation of the mention on the corresponding electronic social network platform. The link 210 may be actuatable (e.g., clickable) to launch a native presentation of the mention (e.g., a presentation on the electronic social network platform to which the mention was contributed).

The textual depiction 202 may also include a tool bar 220 providing one or more tools and/or actions that a user can apply to a given mention. For example, the tool bar 220 may enable a user to reply or otherwise respond to the mention corresponding to the graphical depiction 110a and/or textual depiction 202, retweet the mention, or quote the mention, designate a sentiment of the mention (e.g., as positive "+", negative "−", or neutral "="), mark the mention as spam and/or otherwise remove from the monitor all mentions by the mention author, flag a mention for subsequent attention and/or review, and/or remove ("trash") a mention from the present monitor. Designating a sentiment may change the sentiment indicator (e.g., color) for the selected graphical depiction 110a.

The tool bar 220 may enable a user to provide input to visually mark (e.g., star, flag, mark or change a border) a graphical depiction 110, and the marking may be displayed on or otherwise associated with the graphical depiction. For example, the visual marking may convey a level of importance (e.g., subjective to the user) of the mention, the author of the mention, or the like. The tool bar 220 may also enable a user to provide input to nonvisually mark a graphical depiction (e.g., to mark for a future action, whether manual or automated). As can be appreciated, other actions may also be enabled by the tool bar 220 of the textual depiction 202. In addition, various workflow processes can be set in motion by marking a mention (e.g., sending the mention and the corresponding author information to a different team within an organization for further review or action, sending the mention to someone via email, adding the author to a group of specific people to track or follow in the future, etc.).

The visualization 101 may also visualize relationships between mentions of the monitored (and displayed) portion of the electronic social network content. For example, a mention may be a retweet, copy, reply, comment, or other response to an earlier mention. As another example, a mention may be a repeat (or otherwise substantially repetitive) of another mention. The user interface 100 of FIGS. 1 and 2 may provide a visualization of an interconnection of these related mentions.

Figure 3:
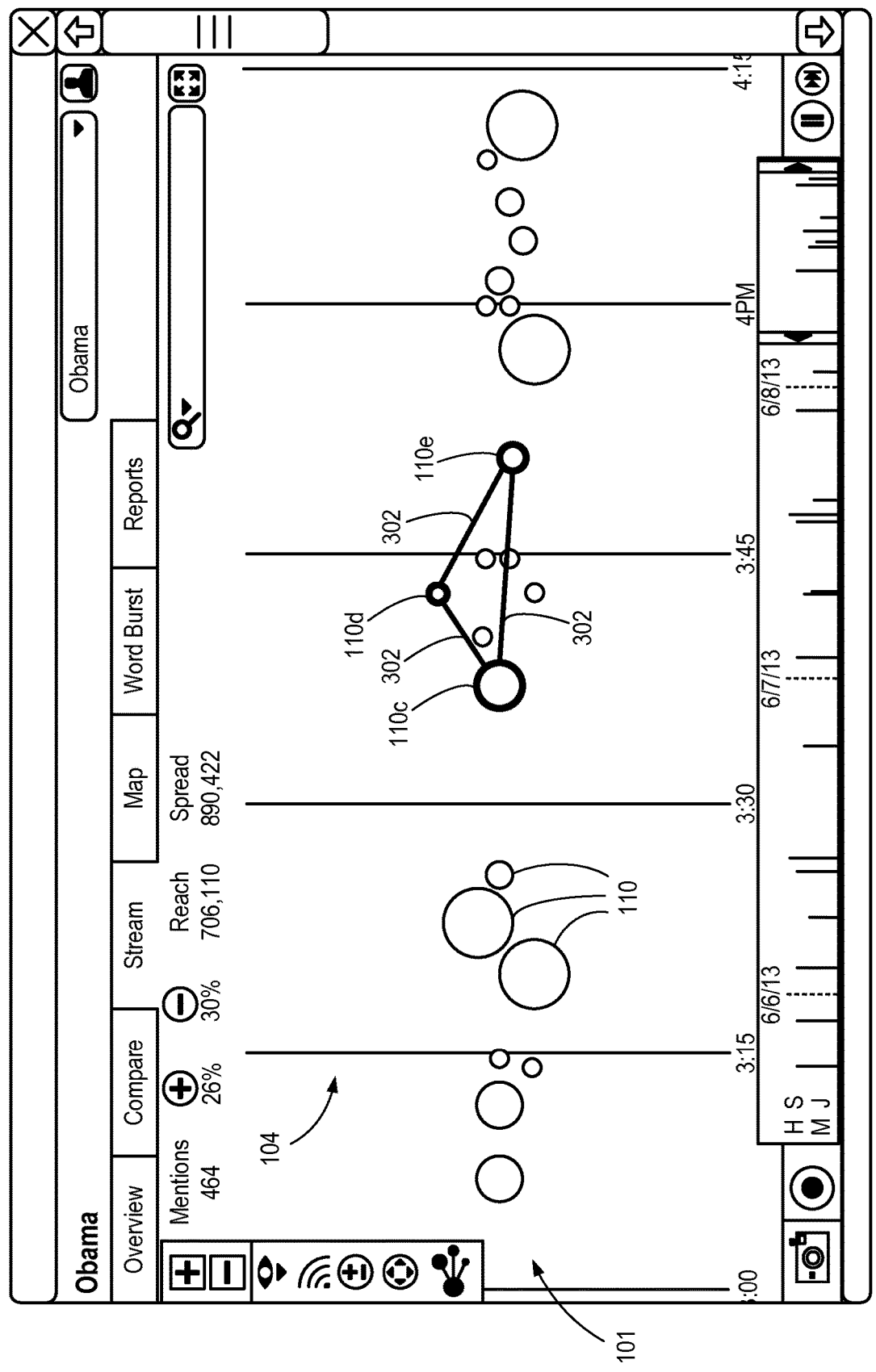
FIG. 3 is the user interface of FIGS. 1 and 2 presenting a visualization of related mentions.

FIG. 3 illustrates the user interface 100 of FIGS. 1 and 2 presenting a visualization 101 showing a relationship of related mentions. A plurality of mentions are represented as graphical depictions 110 on the timeline 104. A connection may be visualized between graphical depictions 110 corresponding to related mentions. For example, the mention corresponding to graphical depiction 110d may be an identical copy or substantially similar repeat (e.g., a retweet) of a mention corresponding to graphical depiction 110c. The mention corresponding to graphical depiction 110e may include substantially similar content as the mention corresponding to graphical depiction 110c and the mention corresponding to graphical depiction 110d. The relationship between these three mentions may be visualized on the visualization 101 by lines 302 connecting the respective graphical depictions 110c, 110d, and 110e.

Referring to FIGS. 1-3, the user interface 100 presents a visualization 101 of electronic social network content that allows a user to monitor, interact with, and discover insights from social conversations in real-time. The visualization 101 can display a large number of mentions and/or conversations of electronic social network content in such a way that a user can, in a single glance, identify which mentions or conversations are of interest and/or of importance and why.

Figure 4:
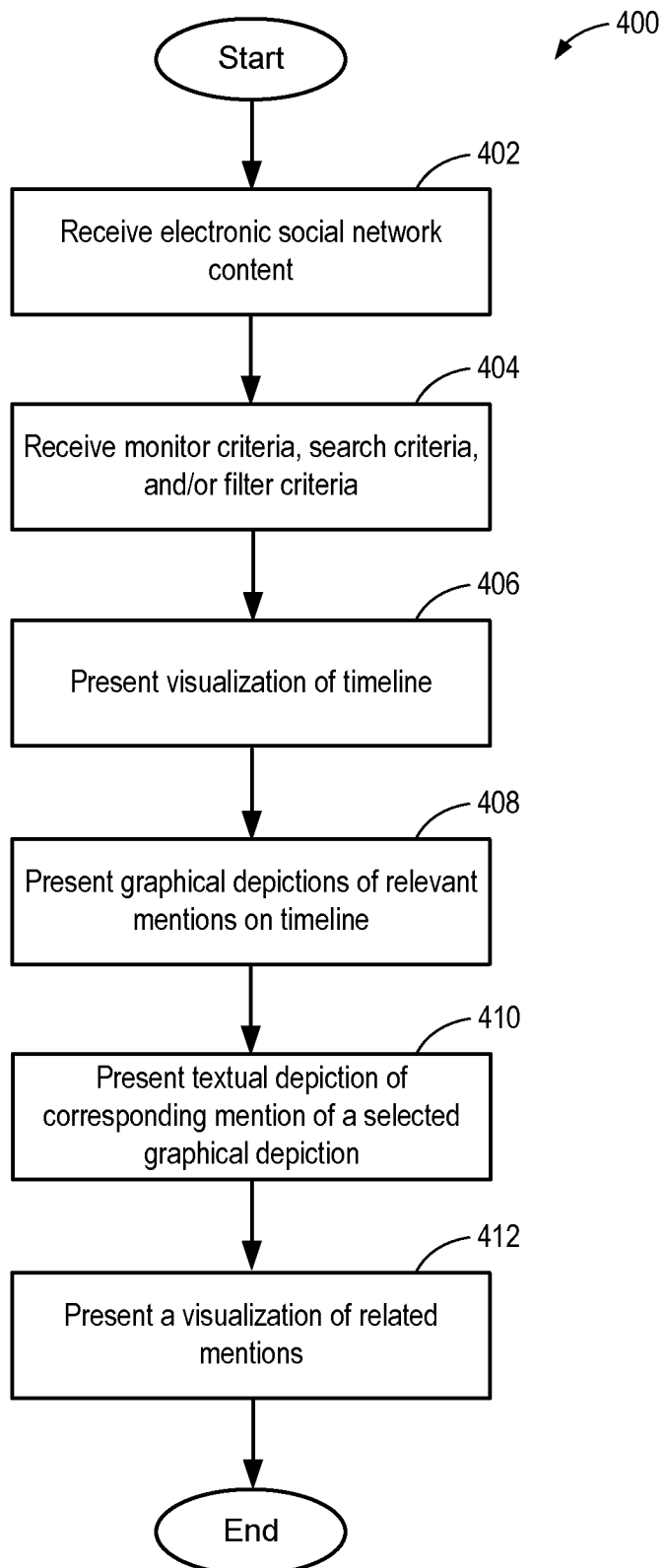
FIG. 4 is a flow diagram of a method for visualization of electronic social network content, according to one embodiment.

FIG. 4 is a flow diagram of a method 400 for visualization of electronic social network content, according to one embodiment. Electronic social network content is received 402 from one or more electronic social network platforms. The electronic social network content may be requested (e.g., pulled), pushed, or a combination thereof, as appropriate and/or as made possible by an application program interface (API) of a given electronic social network platform. The electronic social network content from a given platform may include all available data or a portion of the platform data, for example, according to agreement with a platform. An API of a platform may enable requesting electronic social network content according to criteria (e.g., criteria defining a monitor, keyword search, filter, or the like).

Input may also be received 404 defining a monitor, a keyword search, and/or a filter. For example, a user may provide, via a monitor input field 120 (see FIG. 1), input designating a monitor and/or criteria defining a monitor. Input may be received 404 via a search input field 122 (see FIG. 1) specifying a keyword for searching within a monitored portion of mentions of electronic social network content. Input may also be received 404 via a tool bar 124 (see FIG. 1) specifying a filter to apply to the received social network content.

Input may also be received 404 defining a specific geographic area within which mentions will be gathered and filtered and depicted. Input may also be received 404 defining a specific group of individuals or authors for the system to monitor (e.g., to gather, analyze, and depict the mentions from that defined group of authors).

A visualization of a timeline may be presented 406 for a relevant time period during which a monitored portion of electronic social network content was received. As described above, the timeline may be presented 406 horizontally or vertically and may be presented according to one of a plurality of units of time. Presenting 406 the timeline may include advancing (or shifting) the timeline during a realtime mode to represent a new current time as time elapses. Presenting 406 the timeline may include presenting markings and/or labels to convey a visualization of the timeline.

A plurality of graphical depictions may be presented 408 on the timeline. The graphical depictions presented may be representative of at least a portion of the received electronic social network content that matches the one or more search criteria of the monitor. Each graphical depiction may represent one corresponding mention. In other embodiments, each graphical depiction may represent one or more corresponding mentions. Each graphical depiction may be presented 408 on the timeline at a position corresponding to a time at which the corresponding mention was provided to a corresponding electronic social network platform. Presenting 408 the graphical depictions may include presenting an appropriate size, color, shape, and/or other visual markings to convey information and/or characteristics of the corresponding mention other than actual content of the mention, as described above with reference to FIG. 1. The presentation 408 of graphical depictions may provide visual cues to convey various bits of valuable and insightful information about the mentions and the authors (influence, engagement, demographics, location, sentiment, popularity, virility, followers, etc.), besides the actual content of the mentions.

A textual depiction of a mention may be presented 410 in response to actuation and/or manipulation of a corresponding graphical depiction of the mention. As described above, a graphical depiction of a mention may be actuatable (e.g., clickable, hoverable) to enable or otherwise facilitate interaction with the received electronic social network content. Upon actuation (or manipulation) of a graphical depiction, a textual depiction may be presented 410 to provide additional information about the mention. Presenting the textual depiction may include depicting information about an author of the corresponding mention, a brief summary or preview of a mention, and/or an electronic link to access a native presentation of the mention on the electronic social network platform to which the mention was provided. Presentation of a textual depiction and/or additional information pertaining to a mention is shown in FIG. 2 and described above with reference to the same.

A visualization of related mentions may be presented 412, such as by displaying a connection between corresponding graphical depictions of the related mentions. An example of related mentions may be mentions that are identical or substantially identical. Another example of related mentions may be mentions that include substantially similar content. Another example of related mentions may be a mention that references another mention.

Figure 5:
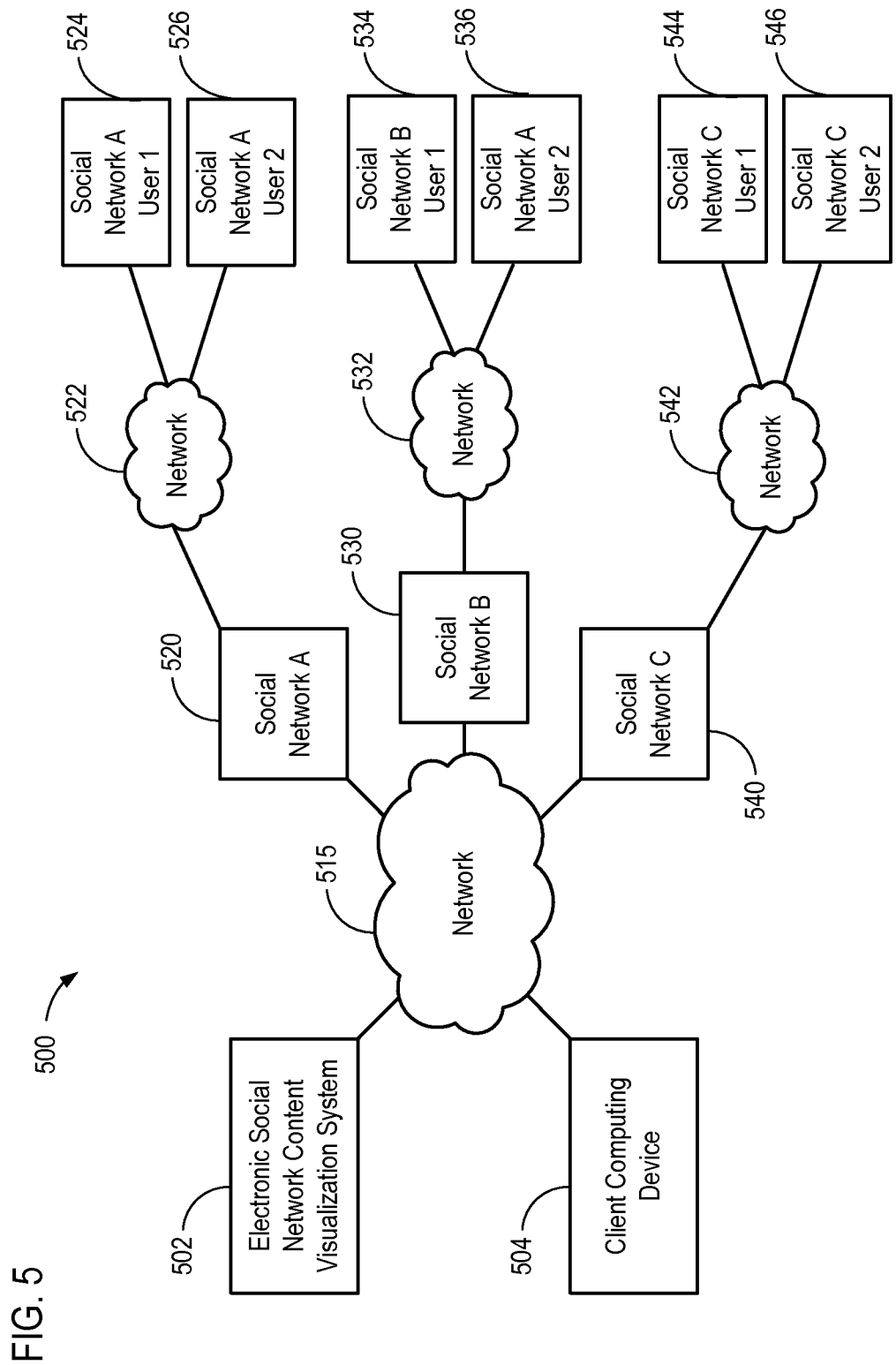
FIG. 5 is a system for visualization of electronic social network content, according to one embodiment.

FIG. 5 is a content visualization system 500, according to one embodiment. The content visualization system 500 may include a system for visualization of electronic social network content 502, a client computing device 504, and a network 515 to couple to one or more electronic social network platforms 520, 530, 540.

Figure 6:
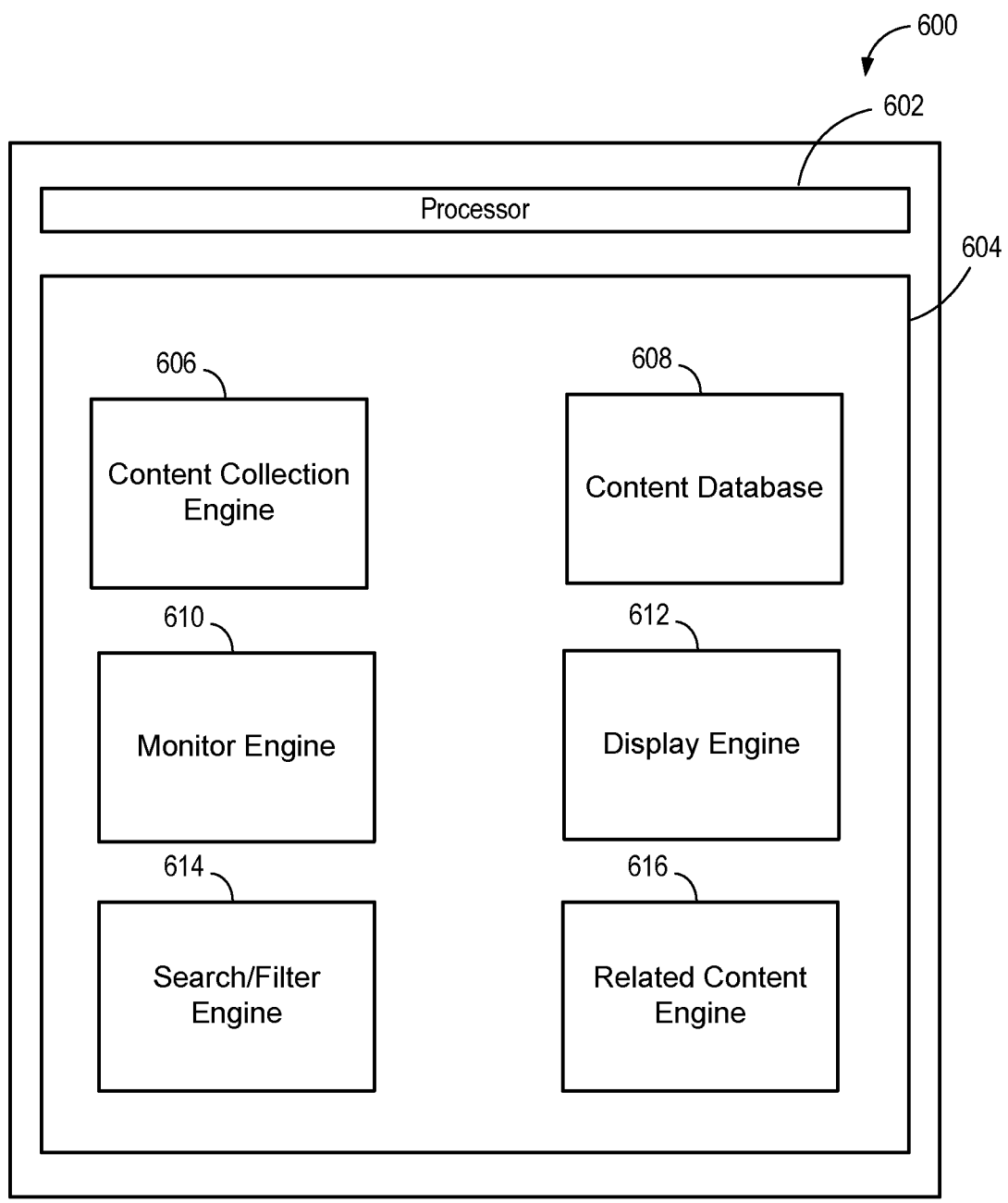
FIG. 6 is a system for visualization of electronic social network content, according to another embodiment.

The system for visualization of electronic social network content 502 may include and/or be embodied in one or more computing devices, such as one or more servers, for obtaining (or otherwise receiving), processing, and visualizing electronic social network content. The system for visualization of electronic social network content 502 may be coupled to or communicate with the one or more social network platforms 520, 530, 540 via the network 515. The electronic social network content may be obtained or otherwise received from the social network platforms 520, 530, 540 through an application program interface (API). The electronic social network content may be pushed to the visualization system 502 or pulled by the visualization system 502, as appropriate for a given social network platform 520, 530, 540. A system for visualization of electronic social network content 502, according to one embodiment, is shown in FIG. 6, and described below with reference to the same.

The client computing device 504 may be coupled to the system for visualization of electronic social network content 502 via the network 515. The client computing device 504 may be used to provide input to the system for visualization of electronic social network content 502, such as input for designating or defining a monitor, input for a keyword search, and/or input for designating or defining a filter. The client computing device 504 may also include a display for presenting a user interface and/or a visualization of at least a portion of received electronic social network content.

The network 515 may be an electronic communication network, such as the Internet. Accordingly, the client computing device 504 may access the system for visualization of electronic social network content 502 using a browser via, for example, the World Wide Web (WWW).

The one or more social network platforms 520, 530, 540 may be any of a variety of third-party platforms for enabling or facilitating electronic social network content among a plurality of users. In FIG. 5, a plurality of users 524, 526, 534, 536, 544, 546 (user computing devices) accessing the one or more social network platforms 520, 530, 540 to provide mentions of electronic social network content. The plurality of user computing devices 524, 526, 534, 536, 544, 546 are shown as coupling to the one or more social network platforms 520, 530, 540 via one or more networks 522, 532, 542. Although the networks 522, 532, 542 are illustrated as separate from network 515 for clarity and organization of the drawing, the networks 522, 532, 542 may in fact be a part of the network 515, such as the Internet. In other words, any of the user computing devices 524, 526, 534, 536, 544, 546 and/or the client computing device 504 may access and/or interface any of the social network platforms 520, 530, 540 and/or the system for visualization of electronic social network content 502 through the network 515, such as the Internet.

A plurality of mention authors may use the plurality of user computing devices 524, 526, 534, 536, 544, 546 to create user profiles and/or generate electronic social network content in the form of mentions on the one or more social network platforms 520, 530, 540. The system for visualization of electronic social network content 502 may receive at least a portion of the generated electronic social network content and provide a visualization of, for example, at least a portion of a monitored portion of the received electronic social network content. The visualization may be provided to and/or displayed on a display, such as a display of the client computing device 504.

FIG. 6 is a system for visualization of electronic social network content 600, according to another embodiment. The system 600 may be one embodiment of the system for visualization of electronic social network content 502 of FIG. 5, described above. The system 600 may include a processor 602, a memory 604, and one or more components, modules, engines, or subsystems, including but not limited to a content collection engine 606, a content database 608, a monitor engine 610, and a display engine 612.

The content collection engine 606 may collect or otherwise receive electronic social network content from one or more electronic social network platforms. The received electronic social network content may be stored in the memory 604, such as in the content database 608. The content collection engine 606 may include interfaces for interfacing with one or more APIs of the one or more electronic social network platforms to receive pushed content and/or to pull desired content.

The monitor engine 610 may receive input specifying one or more search criteria to define a monitor. The monitor engine may also identify mentions of the electronic social network content that match the one or more search criteria, to determine a monitored portion of the electronic social network content.

The display engine 612 may provide a visualization of the identified mentions. The visualization may be provided on a display of a computing device, such as a remote client computing device of a user accessing the system 600. The visualization provided by the display engine 612 may include a plurality of graphical depictions that are representative of at least a portion of the identified mentions of the electronic social network content identified by the monitor engine. Each graphical depiction provided by the display engine 612 may be representative of one corresponding mention of the received electronic social network content. The display engine 612 may present each graphical depiction on a timeline that visually represents a period of time corresponding to when at least a portion of the collected electronic social network content was provided to an electronic social network platform. More specifically, the display engine 612 may present each graphical depiction on the timeline at a position corresponding to a time at which the corresponding mention was provided to a respective electronic social network platform.

The system 600 may also include a search/filter engine 614 to receive search input specifying search criteria to perform a search of mentions of a monitored portion of electronic social network content. The search/filter engine 614 may also receive filter input designating one or more filters to apply to the monitored portion of electronic social network content.

The system 600 may further include a related content engine 616. The related content engine 616 can provide a visualization of related mentions by displaying a connection between the corresponding graphical depictions of the related mentions.

FIG. 7 is a user interface 700 of a system for visualization of electronic social network content, according to another embodiment. The user interface 700 presents a visualization 701 of electronic social network content including a plurality of graphical depictions 710 having different shapes. Each shape could indicate additional information about a corresponding mention. The additional information may include, but is not limited to, indicating a specific social network platform on which the mention originated, whether the author of the mention is male or female, an age range of the mention author, credibility of the mention author, whether or not the mention has been replied to or acted upon by a present user or by others, and mentions about one product or company as compared to another (e.g., as indicated by the company logos as the shapes of the graphical depictions 710). As illustrated, the shapes of the graphical depictions 710 could be any of a variety of shapes, more than just circular shapes, including but not limited to triangles, pentagons, octagons, squares, stars, or even other shapes and/or logos).

FIG. 8 is a user interface 800 of a system for visualization of electronic social network content, according to another embodiment. The user interface 800 provides a visualization 801 having a timeline 804 in a vertical format. The timeline 804 is shown extending from top to bottom across the user interface 800. The bottom of the timeline 804 is representative of more current time and the top of the timeline 804 is representative of past (or historical) time.

Figure 9:
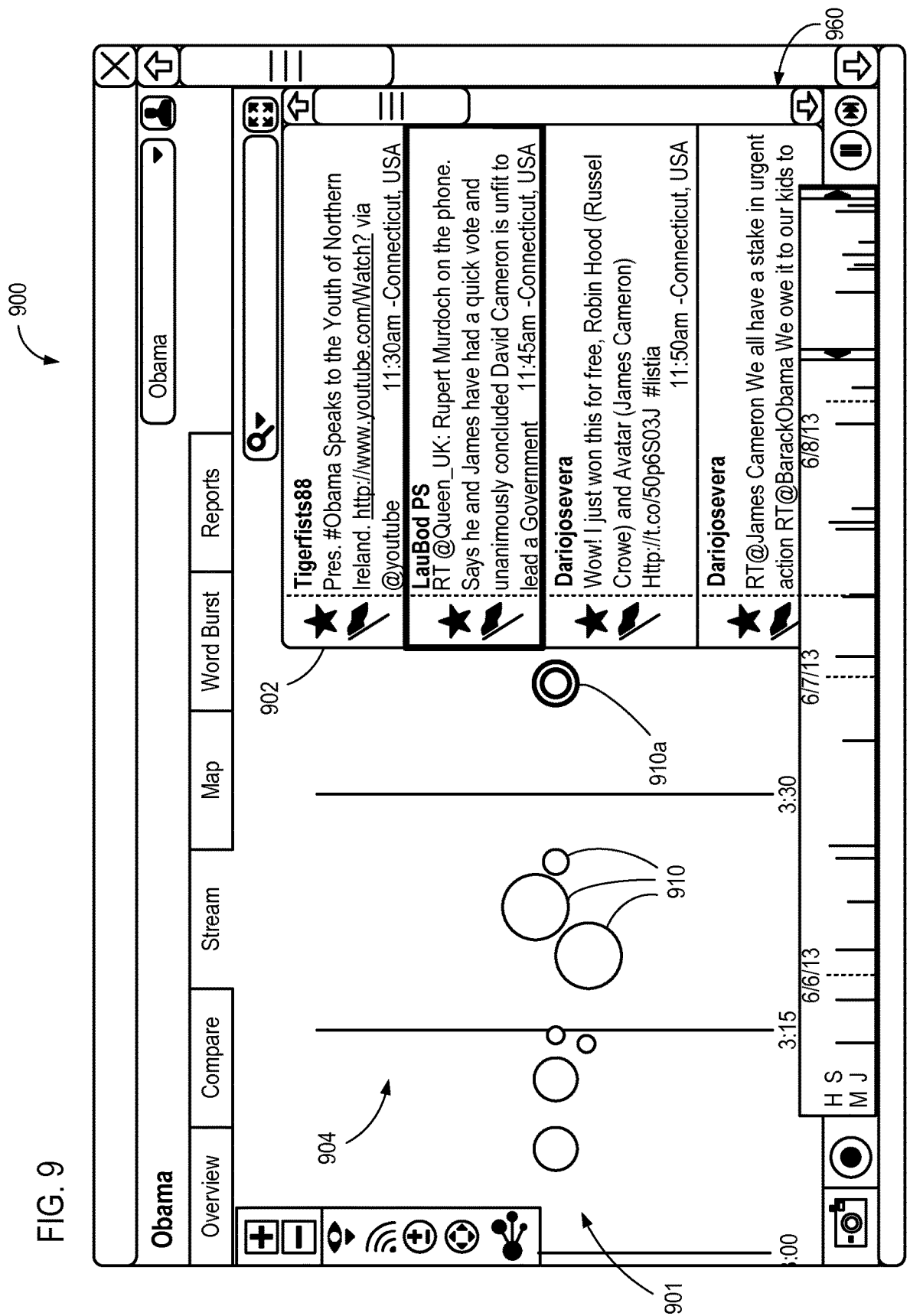
FIG. 9 is a user interface of a system for visualization of electronic social network content, according to still another embodiment.

FIG. 9 is a user interface 900 of a system for visualization of electronic social network content, according to still another embodiment. A visualization 901 of electronic social network content may be provided, including graphical depictions 910 are visualized on a timeline 904. FIG. 9 illustrates a textual depiction 902, according to another embodiment. The textual depiction 902 may be launched (or otherwise appear), such as from a right side 960 of the user interface 900 and/or visualization 901, in response to user manipulation of a graphical depiction 910, such as graphical depiction 910a. The textual depiction 902 may present information about the author of the mention, the content of the mention, a date and/or time stamp of a mention corresponding to the selected graphical depiction 910, and tools for processing or otherwise taking an action on the mention. In addition, the textual depiction 902 may present information pertaining to other mentions, such as mentions that were provided chronologically before, after and/or contemporaneously with the mention of the selected graphical depiction 910a. The textual depiction 902 may enable a user to scroll to view information related to other mentions. The textual depiction 902 may be a scrollable, hideable, resizable column that emerges from the edge of the visualization and allows the user to see information for multiple mentions. A presently selected graphical depiction 910a may be highlighted and a corresponding portion of the textual depiction 902 may be similarly highlighted or otherwise indicated. Tools may be provided within the textual depiction 902 to allow a user to mark a mention or take another action with respect to a mention. As can be appreciated, other embodiments of textual depictions are possible and within the scope of the present disclosure.

Reference throughout this specification to "one embodiment" or "an embodiment" means that a particular feature, structure, or characteristic described in connection with the embodiment is included in at least one embodiment. Thus, the appearances of the phrases "in one embodiment" and "in an embodiment" in various places throughout this specification are not necessarily all referring to the same embodiment. In particular, an "embodiment" may be a system, an article of manufacture (such as a computer-readable storage medium), a method, and/or a product of a process.

Furthermore, the described features, operations, or characteristics may be combined in any suitable manner in one or more embodiments. The order of the steps or actions of the methods described in connection with the embodiments disclosed may be varied. Thus, any order in the drawings or Detailed Description is for illustrative purposes only and is not meant to imply a required order, unless otherwise specified.

Embodiments may include various features, which may be embodied in machine-executable instructions executed by a general-purpose or special-purpose computer (or other electronic device). Alternatively, the features may be performed by hardware components that include specific logic for performing the steps or by a combination of hardware, software, and/or firmware.

Accordingly, the various components, modules, systems, and/or features described herein may be embodied as modules within a system. Such a system may be implemented in software, firmware, hardware, and/or physical infrastructure. Although not always explicitly named herein, a module may be identified (named) based on a function it performs.

For example, a module that is configured to display something may comprise specific hardware, software, or firmware and be properly referred to as a "display module."

Embodiments may also be provided as a computer program product including a non-transitory machine-readable medium having stored thereon instructions that may be used to program, or be executed on, a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable media suitable for storing electronic instructions. Moreover, a computer program product may be run, executed, downloaded, and/or otherwise used locally or remotely via a network.

Many changes may be made to the details of the above-described embodiments without departing from the underlying principles and scope of the present disclosure. The scope of the present invention should, therefore, be determined by the following claims.

What is claimed is:

1. A system for visualization of electronic content, the system comprising:
   a processor;
   a memory having stored thereon instructions that are executable by the processor to cause the system to:
   acquire electronic content comprising a plurality of mentions on a topic, wherein each mention of the plurality of mentions comprises an instance of electronic content having attribution to a single author;
   ascertain a tone of each mention of the plurality of mentions from one or more words within the mention;
   define a monitor with one or more criteria specifying characteristics of mentions;
   identify mentions of the plurality of mentions that match the one or more criteria of the monitor; and
   provide a visualization of the identified mentions to a display of a computing device, the visualization comprising a plurality of graphical depictions that are representative of at least a portion of the identified mentions on the topic, each graphical depiction of the plurality of graphical depictions representative of one corresponding mention of the plurality of mentions on the topic, each graphical depiction visualized on a timeline that is representative of a period of time corresponding to when at least a portion of the acquired electronic content was initially on one or more electronic platforms,
   wherein each graphical depiction is visualized on the timeline at a position on the timeline corresponding to a time at which the corresponding mention was initially on an electronic platform, and
   wherein each graphical depiction representative of the one corresponding mention visualizes the tone of the one corresponding mention.

2. The system of claim 1, wherein the graphical depiction visualizes the tone using color.

3. The system of claim 1, wherein the tone is one of positive, neutral, and negative.

4. The system of claim 1, wherein the tone is one of humorous, political, opinionated, factual, and sarcastic.

5. The system of claim 1, wherein the graphical depiction visualizes the tone using shape of the graphical depiction.

6. The system of claim 1, the instructions further to cause the system to:
   receive input designating a marking of a desired mention; and
   display the marking on the graphical depiction corresponding to the desired mention.

7. The system of claim 1, the instructions further to cause the system to:
   provide with the visualization a textual depiction providing additional information about a given mention, in response to user manipulation of a corresponding graphical depiction of the given mention.

8. The system of claim 7, wherein the additional information about the mention further comprises information about an author of the mention, including one or more indicators conveying information regarding a tone of other mentions attributed to the author.

9. The system of claim 1, the instructions further to cause the system to:
   display with the visualization an indication of related mentions by displaying, on the timeline, one or more lines each representing a connection between corresponding graphical depictions of the related mentions.

10. The system of claim 1, wherein the period of time is one of:
    a known time period; and
    an estimated time period.

11. The system of claim 1, wherein initially on the one or more electronic platforms comprises one of:
    when provided to the one or more electronic platforms; and
    when initially visible on the one or more electronic platforms.

12. A computer-implemented method for visualization of electronic content, the method comprising:
    acquiring electronic content comprising a plurality of mentions for a topic, wherein a mention comprises a single instance of electronic content with attribution to a single author;
    ascertaining a tone of each mention of the plurality of mentions from one or more words within the mention;
    defining a monitor comprising one or more criteria specifying characteristics of mentions;
    presenting on a computing device display a timeline representative of a period of time; and
    presenting on the computing device display a plurality of graphical depictions that are representative of at least a portion of the acquired electronic content that matches the one or more criteria of the monitor, each graphical depiction of the plurality of graphical depictions corresponding to a single mention of the plurality of mentions for the topic, each graphical depiction presented on the timeline at a position corresponding to a time at which the corresponding single mention was initially on an electronic platform, and each graphical depiction representative of the corresponding single mention visualizing the tone of the corresponding single mention.

13. The method of claim 12, wherein a color of the graphical depiction visualizes the tone.

14. The method of claim 12, wherein the tone is one of positive, neutral, and negative.

15. The method of claim 12, wherein the tone is one of humorous, political, opinionated, factual, and sarcastic.

16. The method of claim 12, wherein a shape of the graphical depiction visualizes the tone.

17. The method of claim 12, further comprising:
    receiving input designating a marking of a desired mention; and displaying the marking on the graphical depiction corresponding to the desired mention.

18. The method of claim 12, further comprising:
providing with the visualization a textual depiction providing additional information about a given mention, in response to user manipulation of a corresponding graphical depiction of the given mention.

19. The method of claim 18, wherein the additional information about the mention further comprises information about an author of the mention, including one or more indicators conveying information regarding a tone of other mentions attributed to the author.

20. The method of claim 12, further comprising:
displaying with the visualization an indication of related mentions by displaying, on the timeline, one or more lines each representing a connection between corresponding graphical depictions of the related mentions.

21. The method of claim 12, wherein ascertaining the tone of each mention further comprises considering information regarding a tone of other mentions attributed to the author.

* * * * *